(No Model.)

W. F. BEARDSLEE.
MACHINE FOR MAKING PLAITED GOODS.

No. 316,438. Patented Apr. 28, 1885.

Figure 1.

Witnesses:
Steuben T. Bacon
John Hoch

Inventor:
W. F. Beardslee (No Model.)　　　　　　　　　　　　　　　　　　5 Sheets—Sheet 2.
W. F. BEARDSLEE.
MACHINE FOR MAKING PLAITED GOODS.

No. 316,438.　　　　　　　　　　Patented Apr. 28, 1885.

Figure 2.

(No Model.) 5 Sheets—Sheet 3.

W. F. BEARDSLEE.
MACHINE FOR MAKING PLAITED GOODS.

No. 316,438. Patented Apr. 28, 1885.

Witnesses
Stubbin T. Bacon
John Hock

Inventor:
W. F. Beardslee (No Model.)

W. F. BEARDSLEE.
MACHINE FOR MAKING PLAITED GOODS.

No. 316,438. Patented Apr. 28, 1885.

Witnesses:
Stephen T. Bacon
John Hoch

Inventor:
W. F. Beardslee (No Model.) 5 Sheets—Sheet 5.

W. F. BEARDSLEE.

MACHINE FOR MAKING PLAITED GOODS.

No. 316,438. Patented Apr. 28, 1885.

Witnesses:
Inventor:

UNITED STATES PATENT OFFICE.

WILLIAM F. BEARDSLEE, OF BOSTON, MASS., ASSIGNOR TO THE MANUFACTURERS SPECIAL MACHINE COMPANY, OF DANBURY, CONN.

MACHINE FOR MAKING PLAITED GOODS.

SPECIFICATION forming part of Letters Patent No. 316,438, dated April 28, 1885.

Application filed March 22, 1883. (No model.)

*To all whom it may concern:*

Be it known that I, WILLIAM F. BEARDSLEE, a citizen of the United States, residing at the city of Boston, in the county of Suffolk and State of Massachusetts, have invented a certain new and useful Improvement in Machines for Making Plaited Goods, of which the following is a specification.

My improvement relates to machines for making plaited goods in connection with a sewing-machine, the operation of which secures the plaits when they are formed by the plaiting mechanism.

The first feature of my invention relates to simple and readily-regulated means for adjusting the machine, so that the number of stitches can be adjusted at will to the plaits which are formed, or, rather, to the reciprocations of the plaiter-blade. Thus the operator can make four stitches to one plait or ten stitches, as is deemed best for the work in hand, and this change can be effected by a simple and easily-made adjustment of parts of the machine.

The second feature of my invention relates to the means employed for accurately adjusting the extent of the reciprocal movement or stroke of the plaiter-blade.

Heretofore, so far as I am aware, the presser-foot of the machine has been relied upon to sustain the cloth which is being plaited against the action of the plaiter-blade as the latter advances during the operation of forming each plait, and the smoothing of the material has also been accomplished to a certain extent by the presser-foot, sometimes aided by laterally-projecting plates or smoothing-surfaces connected therewith.

The third feature of my invention consists in an independent smoothing-blade or mechanical finger mounted above and upon the work-plate of the machine, which smoothing device consists, essentially, of a plate, preferably of elastic material, which bears upon the goods being operated upon at points approximating and on both sides of the position of the needle, and which acts also in the nature of a pawl or detent to counteract any tendency of the plaiter-blade during its retreat to draw back or disarrange the material under treatment.

The invention further consists in means for raising or lowering the plaiting-blade and the smoothing-blade or mechanical finger, and also in certain other minor improvements, which will be more fully set forth hereinafter.

In the accompanying drawings.

I have shown my improvements as applied to a Willcox & Gibbs sewing-machine, but they may be employed with equal facility in connection with other forms of machine.

The arrangement herein set forth is specially useful, and is principally intended for plaiting the silk linings ordinarily used in stiff felt hats, the linings of which generally consist of an oval silk portion which covers the top of the hat inside, and a silk band having one of its edges plaited and sewed to the edge of the oval, while the other edge of the plaited band usually lies between the inside of the hat and the sweat-leather. In the manufacture of such linings, in order to compensate for and conform to the varying peripheral curve of the oval center piece, it is necessary to have a greater fullness of the band at some parts than at others, and it is therefore advisable not only that the mechanism shall be adapted to form comparatively large plaits, and also to form two, three, four, or any prescribed number of stitches between the succeeding plaits, but also that the width of the plaits may be readily varied by the operator while the machine is performing its work.

Although the machine herein shown and described is specially designed for the work designated, the utility of the improvements are in no way limited thereto.

In the accompanying drawings an ordinary Willcox & Gibbs sewing-machine, A, is shown, having a rotating shaft, B, for operating the usual looping device. Upon this shaft, B, is placed a sleeve, $b$, which is caused to rotate with the shaft through the instrumentality of a pin, $b'$, projecting radially therefrom, which enters a longitudinal slot, $b^2$, in the sleeve, and thus permits the sleeve to have longitudinal motion on the shaft B while the parts are rotating. Secured to this sleeve are two what I call "screw" or "spiral" cams, $c$ and $c'$, each of which is held in place by set-screws $c^2$, by means of which the cams can be adjusted longitudinally and circumferentially upon the sleeve $b$. Each cam has formed upon its outside a spiral flange or screw-thread, as is clearly shown in Figs. 1, 3, 4, and 5. One cam has a right-hand thread or groove, and the other a left-hand thread or groove, and the outer end of each cam is enlarged diametrically to form the eccentric portions $c^3$, so that anything engaging with the groove or thread of a cam will, as it follows the revolutions of the cam, be gradually pushed outward from the shaft B.

Figures 6, 7, 8:
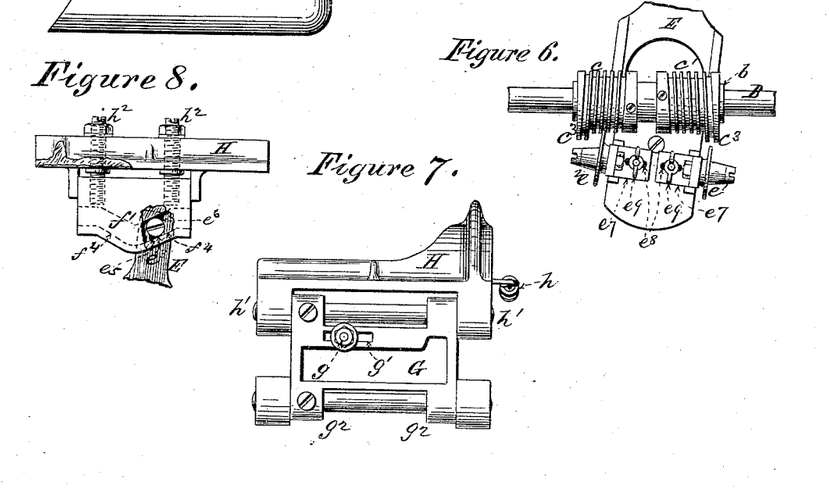
Fig. 6 is a detail view of the spiral or worm cams and the adjoining parts of the vibrating lever, showing the contact-rollers upon the latter made adjustable in position for the purpose of varying the time between its vibrations.
Fig. 7 is an elevation showing the manner in which the plaiter-carrier is mounted at its rear end upon the bed of the machine.
Fig. 8 is a detail view showing the double-incline cam-surface upon which the vibrating lever acts attached directly to the plaiter-carrier support.

Pivoted to the base of the machine, at a suitable position, $e$, with relation to the driving-shaft and cams, is a vibrating lever, E, which is provided with two flanged rollers, $e'$ $e^2$, adapted to engage with the cam-grooves or threads, and mounted on journals forming part of the lever E, said rollers being capable of revolving in a vertical plane. These rollers $e'$ $e^2$, I design to mount upon the vibrating lever E in such manner that they may be adjusted laterally for the purpose of regulating their contact with the worm-cams with accuracy. This may be done, as shown in Fig. 6, by mounting each roller upon a slide, $e^7$ $e^7$, formed with longitudinal slots $e^8$ $e^8$, through which binding-screws $e^9$ $e^9$ pass, and by which the rollers may be secured in any desired position with relation to the spiral grooves in the cams. In place of these rollers, any other suitable device may be provided upon the vibrating lever E which will afford proper means of contact with the cams.

It is to be observed that the alternate contact of the rollers on the vibrating lever with the spiral cams $c$ $c'$ is the cause of the longitudinal movements of the latter and their sleeve $b$ upon the driving-shaft B, the vibrating lever being held stationary temporarily against one or the other of the cams by means of spring-pressure acting upon its opposite end through the medium of an intermediate lever, F, and the lower end of the plaiter-carrier H, &c., which latter parts are in turn actuated positively by the vibrating lever E whenever the eccentric portions $c^3$ of the cams $c$ $c'$ act upon the rollers $e'$ $e^2$ at its other extremity.

The lever E, at the end opposite the rollers, is provided with a vertical pin, $e^3$, which pin is preferably surrounded by a sleeve, which can turn thereon, and which reduces the wear upon the pin. This pin, when the lever E is vibrated horizontally in either direction by the alternate action of the spiral cams $c$ $c'$ upon the rollers $e'$ $e^2$, operates against the inclined surface $f'$ of the intermediate transmitting-lever, F, which is pivoted at one end to the base of the machine, as shown at $f$ in Fig. 5, in such relation to the vibrating lever that the bodies of both levers extend substantially at right angles to each other. By this means when the pin $e^3$, owing to the action of the eccentric portion $c^3$ of one of the spiral cams, $c$, against one of the rollers, $e^2$, upon the opposite arm of the lever E, is moved from the position shown in Figs. 5 and 3 to the left, the free end $f^2$ of the intermediate lever, F, will be made to recede before the vibrating lever E gradually until the pin $e^3$ has passed the center of the double incline, $f'$, of the intermediate lever, F, when the free end $f^2$ of the latter will be caused to return to the position shown in Figs. 3 and 5 by the action of a retractile spring, hereinafter referred to; but the pin $e^3$ will, however, by reason of the oscillation of the lever E, rest against the left-hand side of the double-incline portion, $f'$, of the intermediate lever, F. The vibration of the lever E to the right, owing to the action of the other spiral cam, $c'$, upon the other roller, $e'$, will then cause a corresponding repetition of the movement of the intermediate lever, F, returning the parts to the previous position shown in the drawings, the alternate movements described being repeated intermittently so long as the machine is in operation. As the intermediate lever, F, is moved outward its free end $f^2$ presses against and moves a support or frame, G, to the upper part of which the plaiter-carrier H is hinged or pivoted, while the lower part is hinged to the base of the machine, as shown in Fig. 7 at $g^2$ $g^2$. The carrier-support G, after having been moved outward by the oscillations of the vibrating lever E, pin $e^3$, and intermediate lever, F, in the manner hereinbefore stated, is returned again to its normal position through the instrumentality of a spring, $h$, one end of which is secured to a stationary part of the machine, while its opposite extremity is connected with either the lower end of the plaiter-carrier H or to the carrier-supporting frame G itself. The said frame G is also preferably provided with a stop or bearing-piece, $g$, for engaging with the intermediate lever, which stop $g$ is adjustable horizontally (in a longitudinal slot, $g'$, shown in Fig. 7) with relation to the fulcrum $f$ of the vibrating lever F, so that the extent of motion of the supporting frame G, and consequently the "stroke" of the carrier H and its plaiting-blade, may be varied.

The inward movement of the carrier-support G, caused by the retractile spring $h$, is limited by means of an adjustable screw-stop, $i$, which passes through and is held by a vertical arm, $i'$, which projects from the base of the machine.

It is obvious that the extent of movement of the carrier-support G may be gaged or varied within certain limits through the instrumentality of either the adjustable bearing $g$ upon the support G itself or the adjustable stop $i$ upon the frame of the machine; but they are both, preferably, adjusted with relation to each other so as to act in unison, the bearing $g$ being regulated in position in accordance with the extent of movement desired, so as to avoid all lost motion between the parts, while the stationary stop $i$ is correspondingly adjusted so as to relieve the intermediate lever, F, from the strain of the retractile spring $h$ when the parts are in their normal position.

The double-incline cam $f'$ may, if preferred, be attached to or formed directly upon the plaiter-carrier support G, as shown in Fig. 8, and the intermediate lever, F, dispensed with without materially altering the relative action of the remaining parts. In such case the regulation of the extent of throw or stroke to be imparted by the vibrating lever to the plaiter-carrier may be provided for by making the bearing-pin $e^3$ adjustable longitudinally in a slot, $e^6$, in the said lever, as shown in Fig. 8, or by other similar means that will permit of the point of contact between the said lever and cam being moved nearer to or farther from the fulcrum $e$ of the lever; or the double-incline cam $f'$ itself may be made adjustable upon the body of the carrier-support G, as indicated in Fig. 8, by means of set-screws $h^2 h^2$ or otherwise, so that the distance between its cam edges and the fulcrum $e$ of the vibrating lever E may be varied, the result in either case being the same. When thus incorporated directly with the carrier-support H, the double-incline cam $f'$ may be made in the form of a cam-groove, $f^4$, for the reception of the bearing-pin $e^3$ of the vibrating lever E, as indicated partly by dotted lines in Fig. 8.

The vibrating lever E is prevented from moving too far in either direction by means of stops $e^4 e^4$, situated upon a stationary part of the machine, and which are preferably made adjustable laterally with relation to the lever. These stops $e^4 e^4$ also obviate the possibility of any undue strain or pressure upon the cams $c c'$, which might otherwise be transmitted to them from the retractile spring $h$, and which would tend to prevent their movement longitudinally upon the driving-shaft.

In order to provide for the accurate adjustment and centralization of the double-incline portion of the cam $f'$ with relation to the spiral or screw cams $c c'$ on the driving-shaft and the fulcrum $e$ of the vibrating lever E, for the purpose of preventing any inequality or imperfection in the engagement of the rollers $e' e^2$ with the said spiral cams, I design to make the said double incline $f'$ in the form of a plate, $f^3$, which shall be adjustable longitudinally upon the body of the intermediate lever, F, by means of longitudinal slots and set-screws, as shown in the drawings, or by other suitable means.

Mounted upon the top of the frame G is a plaiter-blade-carrier, H, the method of pivoting or hinging the parts together being indicated at $h'$ in Fig. 7. The form of the blade-carrier will be readily seen by reference to Figs. 3 and 7. It extends from the back of the machine over the cloth-plate thereof until it reaches a point in front of the needle, or between the operator and the needle. The blade-carrier, near the point where the blade is attached to it, moves between guides $h^3 h^3$, which are secured to the cloth-plate of the machine, and cause the end of the carrier and the plaiting-blade to travel in lines which are substantially parallel to the upper surface of the cloth-plate.

The retractile spring $h$, which was before referred to as performing the function of bringing the carrier-support G back into its normal position, in fact connects with the rear end of the blade-carrier H in such manner as to tend constantly to withdraw the plaiter-blade $l$ away from the needle.

Figure 9:
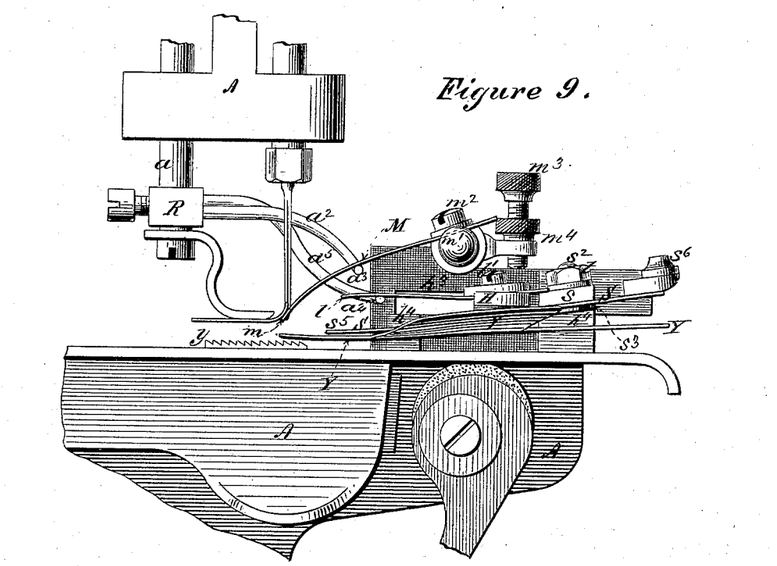
Fig. 9 is a front elevation of the parts of the mechanism by which the plaits are formed enlarged and in the positions which they assume when the plaiter-blade is retracted and the presser-bar is elevated.
Figure 10:
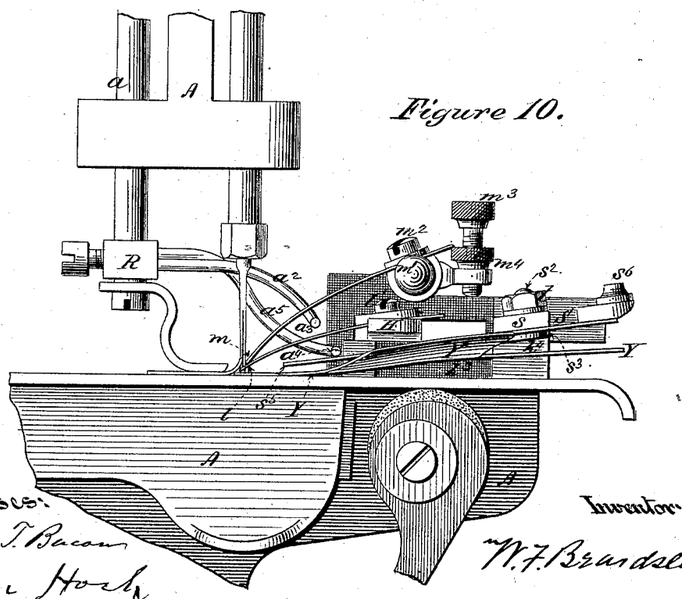
Fig. 10 is a similar view showing the same parts in the position which they assume when the presser-bar is lowered and the plaiter-bar has advanced.

The plaiter-blade $l$ is attached by a screw or other suitable means to the end of the blade-carrier H, as is shown in Figs. 9 and 10. This blade is preferably made of a piece of clock-spring steel, and as the blade-carrier H practically moves very nearly in a line parallel with the work-plate, as stated, (the deviation caused by the oscillation of the carrier-support G being very slight,) the shape of the blade must be such as to bear with proper force upon the goods beneath, or it can be arranged so that said blade can be adjusted in regard to the pressure desired by placing a wedge shaped piece of steel with a slot in it for the passage of the screw $l'$ under the blade, and between it and the carrier H, by moving which wedge back or forth the pressure exerted by the blade $l$ may be varied, or the same result may be effected by any other suitable means.

Figure 1:
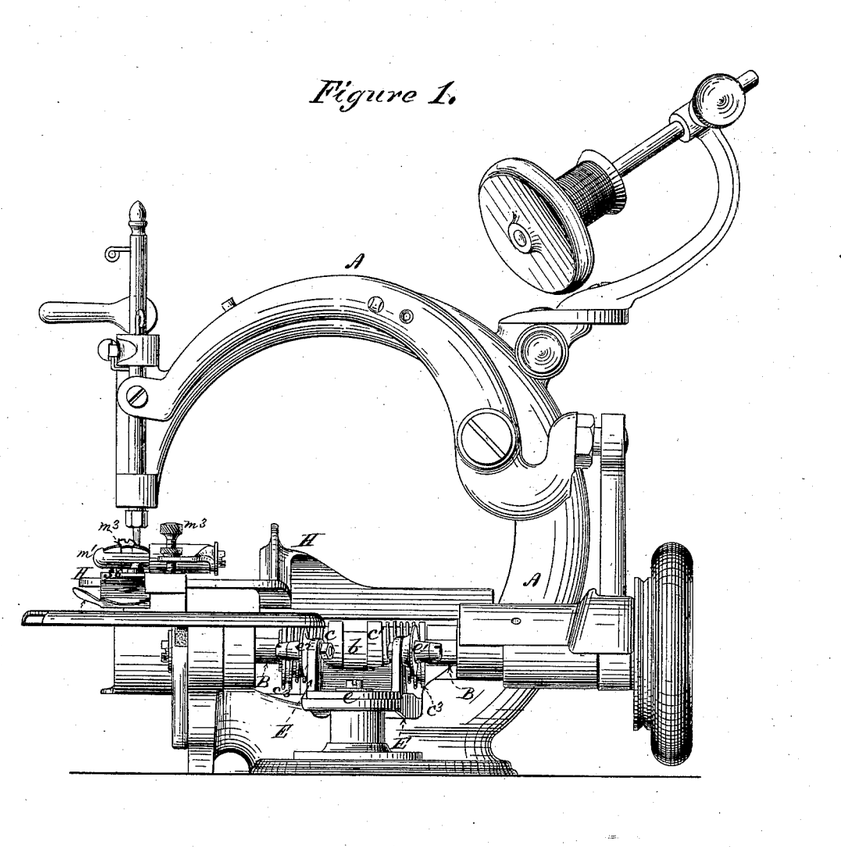
Figure 1 represents a side elevation of a sewing-machine to which my improved plaiting mechanism is applied.
Figure 2:
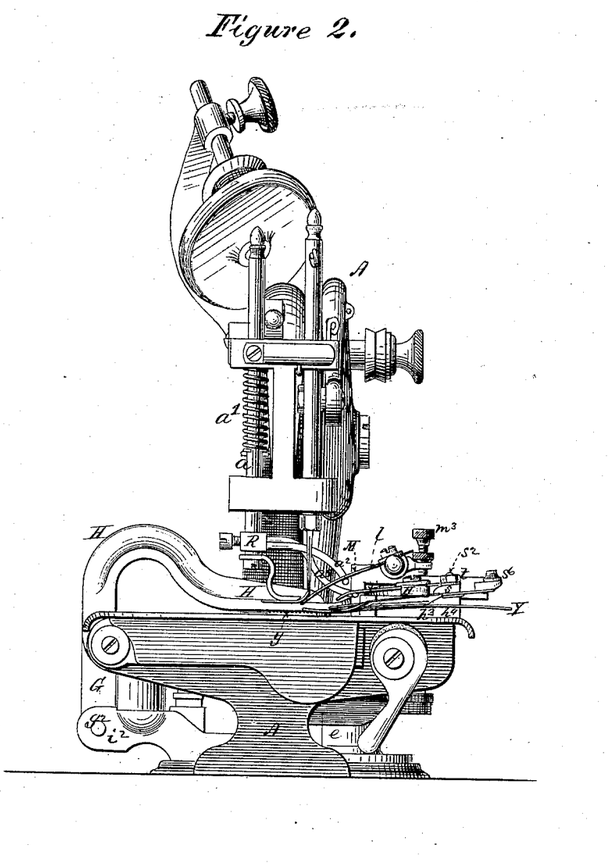
Fig. 2, a front elevation, and Fig. 3 a plan, of the same.
Figure 3:
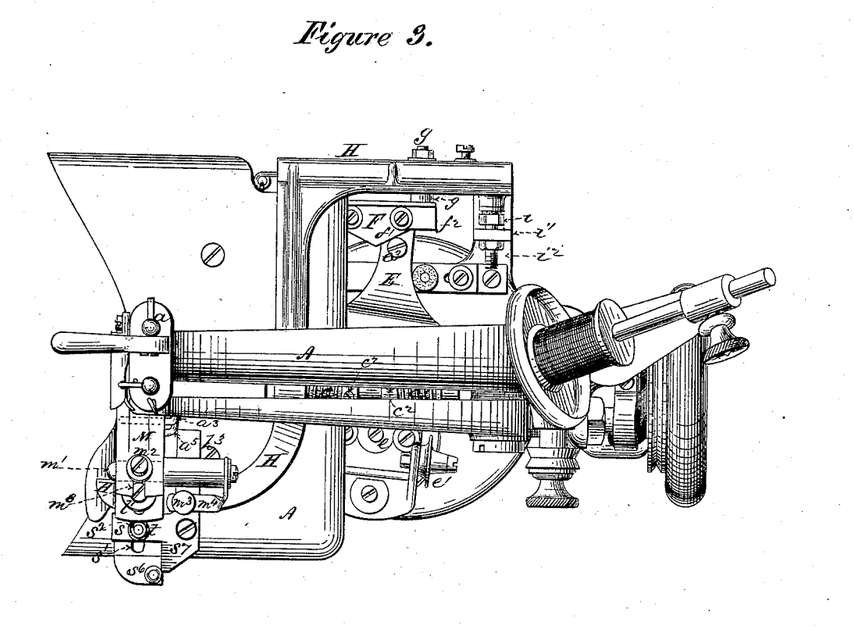
Figure 4:
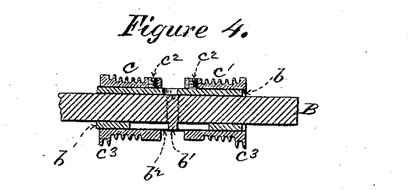
Fig. 4 is a detail view of the spiral or screw cams by which the vibrating lever which causes the plaiter-carrier to reciprocate is actuated, being a longitudinal section through the said cams, the sleeve to which they are secured, and a portion of the driving-shaft of the machine.
Figure 5:
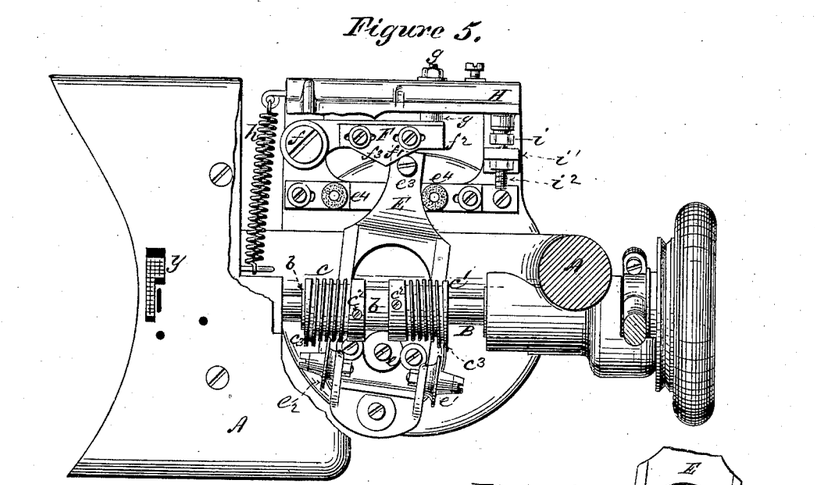
Fig. 5 is a plan from which the upper parts of the machine and the reciprocating plaiter, &c., are omitted, and having portions of the work-plate and plaiter-carrier broken away to more fully expose the spiral cams and vibrating lever and the means for adjusting the extent of movement of the plaiter.

It is to be observed that the carrier-support G is arranged so as to assume or approximate a vertical position when at rest, as will be seen by reference to Fig. 2, so that when it is forced outward by the action of the cams $c c'$ through the medium of the vibrating and transmitting levers E F, as hereinafter set forth, it will draw the rear end of the plaiter-carrier downward in the arc of a circle of which its fulcrum $g^2$ is the center. This action will tend to tilt the front edge of the plaiter-blade forward and downward slightly in the direction of the needle as it advances toward the latter, there being sufficient looseness or play between the guiding-surfaces $h^3$ $h^3$ to allow the front end of the carrier H to conform to the movement. The effect of this will be to slightly and gradually increase the pressure exerted by the edge of the blade upon the material to be ruffled during the formation of each plait. During the retreat of the blade $l$ and the return of the parts to their normal positions it is obvious that this augmented pressure exerted by the edge of the plaiter-blade $l$ will be gradually decreased, so that the plaiter will pass more freely over the cloth, and will have less tendency to pull back or derange the latter. The acting edge of the plaiting-blade $l$ may be slotted, so that in its extreme forward throw the portions on each side of the slot pass the needle of the sewing-machine, by which means, when a plait is formed by the blade, the needle in descending will be certain to pass through the three thicknesses of material, all of which have to be caught to insure the proper sewing down of the plait. In this respect the blade does not differ materially from the blades ordinarily employed in connection with the well-known Johnson ruffler, which is used as an attachment for the various sewing-machines in the market, the blade of my mechanism operating upon the goods, forming the plait, tucking it under the pressure-foot, &c., in substantially the same way as do the blades of the said Johnson ruffler.

I will now refer to the operation of the parts of the machine which I have thus far described.

With an ordinary ruffling or plaiting machine every time the driving-shaft makes a revolution a stitch is formed and a plait is formed, both of which may be of varying lengths. In my machine, however, this may not always be the case, but as I have before said, two, three, four, or five stitches may be made to intervene between any two adjacent plaits. Suppose that it is desired to make three stitches between two adjoining plaits. With a screw-driver I loosen the screws $c^2$ $c^2$, Figs. 4 and 5, and adjust the spiral cams $c$ $c'$, either one or both, along the sleeve $b$ to the proper distance with relation to each other, which distance depends upon the pitch of the flanged grooves or screw-threads cut upon the spiral cams and may vary with different machines. Having obtained the proper adjustment, I tighten up the set-screws $c^2$ $c^2$ against the sleeve $b$. Instead of disturbing the cams $c$ $c'$, which in some machines it may be desirable to make arbitrary in position with relation to each other, I simply loosen the clamping-screws $e^9$ $e^9$ and adjust the positions of the rollers $e$ $e'$ with relation to each other and to the grooves upon the worm-cams in such manner that each roller will alternately engage with the last three convolutions upon its particular cam, as would be the case in Fig. 6. In some cases, for greater accuracy, or where the extent of adjustment of either the cams or the rollers is necessarily limited, it may be desirable to change the positions of both cams and rollers. In either case, the machine, for illustration, will then be in the position shown in Figs. 5 and 6, the wheel or roller $e^2$ being in contact with the spiral groove upon the surface of the screw-cam $c$. As the shaft B is rotated the cams $c$ $c'$ and sleeve $b$ will also be rotated, and at the same time will slide to the right upon the shaft B. At each revolution of the shaft a stitch will be made in the fabric, and the fabric will be fed by the feed-dog $y$ the determined length of the stitch; also, at each revolution of the shaft B the screw-cam $c$ will advance one turn of its thread to the right, and after three stitches have been made the roller $e^2$ will be upon the portion of the screw-cam $c$ represented by $c^3$, which is the point of greatest diameter of the screw-thread upon the cam. As the roller $e^2$ nears this position it is gradually pushed away from the shaft B, which operation causes the lever E to oscillate upon its fulcrum $e$, bringing the pin $e^3$ directly on or a little beyond the apex of the double-inclined surface $f$ of the intermediate lever, F. This operation will have forced back the carrier-support G and the blade-carrier H, causing the blade $l$ to advance toward the needle and make a plait, which is secured by the needle. The instant the pin $e^3$ has passed the apex of the double-inclined surface $f'$ of the intermediate lever, F, the spring $h$ pulls back the blade $l$, the blade-carrier H, and its supporting-frame G, and the said intermediate lever, F. The effect of this is to cause the inclined surface $f'$ of the lever F on the left of the apex to force the pin $e^3$, and with it the lever E, to vibrate upon its fulcrum $e$ until the said lever E projects as much to the left of the apex of the inclined part $f'$ of the intermediate lever, F, as it previously did to the right, which will bring the roller $e'$ into the same relation with the screw-cam $c'$ as the roller $e^2$, previously occupied in connection with the other screw-cam, $c$. The machine will then go ahead, feeding the goods and making stitches, but without making a plait, until the roller $e'$ begins to be forced away from the shaft B by the eccentric portion of the screw-cam $c'$, and when the largest portion $c^3$ of the said cam is reached the plait will be formed and the lever E will be, by the spring $h$, blade-carrier H, supporting-frame G, and intermediate lever, F, almost instantaneously returned to the position previously described, and shown in Figs. 5 and 6, and the machine will continue to sew without making a plait until the prescribed number of stitches have been made, when the whole operation will be repeated.

It is clear to be seen, after this explanation, that the farther apart upon the sleeve $b$ the screw-cams $c\ c'$ may be located, or, what would practically amount to the same thing, the nearer the bearing-rollers $e'\ e^2$ may be adjusted with relation to each other, the greater the number of stitches which will be formed between any two adjacent plaits, since each convolution of the screw-threads upon the cams $c$ or $c'$ provides for an extra stitch between the plaits; but it must be understood that the last convolution of the thread on the outer end of each screw-cam must gradually increase in size diametrically, so as to give the plaiter-blade its positive forward throw, which is necessary for the formation of the plait. Thus each screw-cam has a cylindrical portion provided with the spiral groove or thread, which serves, in connection with the roller it may be engaged with, merely to move the sleeve $b$, and with it the two screw-cams $c\ c'$ longitudinally along the driving-shaft in either direction, according to which cam is in contact, while the enlarged eccentric portion serves to operate positively the vibrating lever E, and through the intermediate devices the plaiting-blade.

As a result of my improved construction it is also to be observed that I am enabled to conveniently and quickly adjust the machine so as to regulate the number of plaits with relation to the number of stitches by simply loosening and retightening one or more set-screws, $c^2\ c^2$ or $e^9\ e^9$, and without removing or disturbing any portion of the mechanism. This is an advantage of importance in the practical and continuous working of the machine, since the annoying and costly delays incident to the old methods of effecting a variation in the number of stitches to the plait is avoided, as well as the requisite of special mechanical skill on the part of the person making the change, since by my improved construction any person of ordinary intelligence can make the adjustment with the aid of an ordinary screwdriver or equivalent means.

By an inspection of the plaiting mechanism it will be seen that the extent of motion of the vibrating lever E does not vary, and that the same is true concerning the intermediate lever, F, although in machines of this class it is desirable sometimes to alter the extent of throw of the plaiting-blade in order to produce plaits of different widths, as in cases where the machine is to be employed for a considerable length of time in the continuous formation of plaits of a uniform prescribed size in connection with a particular class of work. To accomplish this the stop $g$ is adjusted horizontally in the longitudinal slot $g'$ in the carrier-support G, it being obvious that in proportion as the said stop or bearing-piece $g$ is approached to or removed farther from the fulcrum $f$ of the intermediate lever, F, the motion imparted by the latter to the carrier-support G, and consequently the throw of the plaiting-blade, will be increased or diminished, although the extent of movement of the intermediate lever, F, itself will remain constant.

The return or backward movement of the plaiter-blade may also be limited or decreased, if desired, irrespective of the adjustment between the intermediate lever, F, and the carrier-support G, just referred to, by means of the adjustable stop $i$, mounted upon the base of the machine; but it will be observed that irrespective of the regulation of the extent of movement of the plaiter-blade as above stated its forward edge always advances to the same position with relation to and beyond the needle.

A device, which is in effect a combined smoother and detent, M, is mounted upon the top of the work-plate. This device consists, essentially, of a mechanical finger or plate, M, hinged or pivoted to a stationary part of the machine in such manner that one of its edges $m$ projects downward and bears upon the material under treatment in a line coinciding with or approximating the position of the needle, which line of contact is at right angles to the direction in which the material is fed through the machine. The bearing-edge $m$ will thus smooth out and regulate the material passing under it, while the pressure it exerts will tend to counteract any backward strain upon the goods that may be caused by the plaiting-blade during its retreat.

The plate M is preferably made elastic, and, as shown in the drawings, is secured to a fulcrum, $m'$, mounted in front of the needle and above the plaiting-blade $l$ by a set-screw, $m^2$, which passes through a longitudinal slot, $m^8$, (shown in Fig. 3,) in the plate M, so as to provide for the adjustment of its forward edge $m$ with relation to the position of the needle, the said bearing-edge $m$ being slotted so as to extend beyond the latter, if required. The hinge or fulcrum $m'$ allows the plate M to adapt itself to the thickness of the goods to be acted upon or to be raised from contact therewith if required, as hereinafter mentioned.

By forming the plate M of elastic material and attaching it rigidly to a stationary part of the machine, it may be made to adapt itself to the thickness of the goods under treatment and still exert sufficient pressure to perform the service required of it; but when the blade M is free to turn upon its fulcrum, as shown, whether made of elastic material or not, it is necessary to impart to it a certain degree of pressure or resistance, which may be accomplished in a variety of ways, one of which is contained in the machine illustrated in the drawings. For instance, the fulcrum $m'$ of the plate M may be prevented from turning in the direction opposite to that of the position of the needle by a set-screw, $m^3$, or other similar device attached to a laterally-projecting arm, $m^4$, of the fulcrum $m'$, and capable of being adjusted so as to bear against a stationary part of the machine when the blade is lowered, thus practically constituting a rigid connection for the time being and utilizing the elasticity of the blade itself to accomplish its work. One advantage of this method is that it provides for the regulation of the pressure to be exerted by the plate M by means of the adjusting device $m^3$. When not so used, the adjustable stop $m^3$ is simply arranged to act as a limitation to the degree to which the plate M may be elevated above the work-plate of the machine.

The outer end $a^3$ of an extension or arm, $a^2$, projecting from the presser-bar $a$, projects under the body of the mechanical finger or smoothing-plate M in such position with relation thereto that when the presser-bar is raised the said plate M will be elevated sufficiently above the parts underneath to allow the goods under treatment to be conveniently inserted or removed. The outer end $a^4$ of another lateral projection or arm, $a^5$, of the presser-bar $a$ extends under the plaiting-blade $l$ in such relation thereto that when the presser-bar $a$ is raised it will simultaneously raise the bearing-edge of the plaiting-blade $l$, as shown in Fig. 9, to facilitate the insertion or removal of the upper thickness of material. Both these arms or projections $a^2$ and $a^5$ may be secured to a sleeve or collar, R, which is adjustable vertically upon the lower end of the presser-bar for the purpose of accurately regulating the position of the said arms with relation to the smoothing-plate M and the plaiting-blade $l$.

An adjustable shield or gage-plate, S, is secured to a stationary part or bearing, $s$, of the machine in such manner that its inner end is interposed between the work-plate or the separating-plate Y and the plaiting-blade $l$, as indicated in Figs. 9 and 10. This gage-plate S may be made adjustable with relation to the position of the needle by any suitable means, that shown in the drawings consisting in forming the gage-plate S with a longitudinal slot, $s'$, (shown in Fig. 3,) through which stud $s^2$ passes, the upper end of the said stud $s^2$ being formed with a screw-thread and secured to the stationary arm $s$ by means of a nut, $t$. The screw-stud $s^2$ is also formed with a broad head or supporting-shoulder, $s^3$, which sustains the body of the gage S between it and the under side of the stationary bearing $s$, and the head or shoulder $s^3$ may be provided with a broad spring-washer, which will afford a yielding pressure sufficient to hold the gage S stationary when at rest, but which will permit it to forcibly move in or out by hand, as desired.

The alignment of the gage S is preserved by reason of its contact with vertical surfaces $h^4 h^4$, situated in a plane parallel to the line of motion of the plaiting-blade, or by other well-known means, and its body is either set at such an angle or bent in such a manner that its inner end, $s^5$, projects downward toward the work-plate in the direction of the needle. It will be seen that the extent of this projection toward the needle will govern the size of the space which is exposed to the action of the plaiter $l$ between the edge $s^5$ of the gage S and the lower end $m$ of the smoothing-plate M.

The outer end, $s^6$, of the gage-plate S is formed with a handle or finger-piece for the convenience of the operator in moving the gage toward or from the needle.

A scale, $s^7$, (shown in Fig. 3,) may also be formed upon a stationary part of the machine adjoining the gage-plate S for greater convenience in regulating the width of the plaits where accuracy is of special importance.

The operation of the parts of the mechanism above the work-plate of the machine, and laterally referred to, is as follows: The presser-bar $a$ is first elevated against the resistance of its spring $a'$ (shown in Fig. 2) by the ordinary means. This act causes the end $a^4$ of the presser-arm $a^5$ to raise the plaiting-blade $l$ above and free from the parts underneath, and also elevates the end $a^3$ of the other presser-arm, $a^2$, and with it the mechanical finger or smoother M, as shown in Fig. 9. The material to which the plaited goods is to be sewed is then introduced upon the surface of the work-plate, underneath the ordinary separator-plate Y, and the material to be plaited is introduced above the latter, and between it and the shield or gage-plate S, plaiter-blade $l$, and smoothing-plate M, both thicknesses of material being brought within the field of action of the feed mechanism. The presser-bar $a$ is then lowered in the ordinary way, causing the parts to assume the relative positions shown in Fig. 10, excepting that the thicknesses of the material to be operated upon are not shown in the said figure. In other words, the descent of the presser-bar $a$ lowers the end $a^4$ of the presser-arm $a^5$ from contact with the under side of the plaiting-blade $l$, leaving the latter free to act upon the exposed surface of the material to be plaited, and also lowers the end $a^3$ of the presser-arm $a^2$, and with it the mechanical finger or smoothing-plate M, causing its lower edge $m$ to press both thicknesses of the material under treatment downward against the separating-plate Y and the surface of the work-plate, respectively. If the ruffling is to be formed in a straight line and of uniform size, the latter is now prescribed by adjusting the gage-plate S with relation to the needle so as to expose to the action of the edge of the plaiting-blade $l$ a portion of the surface of the material to be plaited equal only to double the width of the plait desired, in which position the gage S may be secured by tightening the nut $t$; but, supposing it is desired to sew the upper material as fast as plaited to an under material in curved or irregular lines, or for other reason to vary the relative widths of the plaits formed during the operation of the machine without stopping the latter, in such case the nut $t$ is not tightened, but the gage-plate S is left with sufficient looseness to enable the operator to readily slide it back and forth longitudinally by means of its outer end, $s^6$. The machine being now set in motion, and having made the prescribed number of stitches between each plait, as hereinbefore set forth, the forward movement of the plaiting-blade $l$ causes its edge, as soon as it has passed beyond the inner end of the gage-plate S, to take up and carry forward the material from that point to and beyond the lower end $m$ of the smoother M, and under the needle, when the plait is secured before the plaiting-blade retreats. The plate M affords the requisite resistance to the advancing material, and firmly holds the portion immediately underneath it until the tuck is completed and secured by the needle and the feed mechanism advances the goods, when—the plaiting-blade $l$ having again retreated away from the needle, and the machine having again made the prescribed number of stitches—the operation is repeated.

From this it will be seen that the smoothing-plate M, in addition to insuring a uniform and even condition of the material as it passes to, and is acted upon by, the needle, also performs the office, heretofore delegated to the presser-foot, of assisting and acting in conjunction with the plaiting-blade in the operation of forming the plaits. It also performs another important service in preventing any retrograde movement of the upper thickness of material, and in counteracting the tendency of the plaiting-blade during the retreat of the latter to strain or derange the said material while it is being sewed. The inclined position of the smoothing-plate M in front of the needle also contributes to its effectiveness in thus acting in the nature of a pawl or detent.

In plaiting and sewing a band to the edge of a piece of material of curvilinear outline, it is requisite, in order to make a neat and even appearance, that the width of the plaits should be increased or diminished to correspond to and compensate for the variations in the curve, being made wider when a convex curve is encountered and narrower when a concave curve is reached. Since, as in the case of the linings for hats, hereinbefore referred to, and which this machine is especially adapted to operate upon, the curves may vary considerably in degree or abruptness, and since in other cases it is sometimes necessary to proceed from a convex to a concave curve, or vice versa, it is practically impossible to provide for the automatic regulation of the width of the plaits by the machine itself, the degree of perfection attainable in the work being necessarily governed by the judgment, watchfulness, and skill of the operator. For this reason, any means which will facilitate the rapid adjustment or variation of the width of the plaits and bring their formation more completely within the control of the operator is of great importance. This I accomplish by means of the gage-plate S, by the use of which a watchful operator can vary the width of the plaits with relation to each other and to the curve being operated upon with the greatest accuracy and uniformity in effect, and this by simply moving in or out a plate which can be conveniently controlled by the fingers of one hand while the other hand is engaged in feeding the material irrespective of the speed at which the machine may be running.

In this connection another important fact is to be borne in mind—namely, that the plaiter-blade always, when once "set" upon its carrier, makes the same forward stroke and brings the plait directly under the needle, which latter enters and secures the plait before the plaiter-blade retreats. If the stroke of the plaiter were varied and made shorter for narrow or longer for wide plaits, the time with relation to the reciprocation of the needle would be varied, and in some cases the needle would catch the plait and sometimes it would not; but by the use of the movable shield or gage any required depth of plait can be obtained, while the extent of stroke of the plaiter-blade remains constant and such that it invariably brings the plait under the needle, from which position it cannot be pulled back by the retrograde movement of the plaiter-blade.

What I claim as my invention, and desire to secure by Letters Patent, is—

1. In a combined plaiting and sewing machine, a pair of cams secured to the driving-shaft of the machine by means that will permit of their moving longitudinally upon the said shaft in either direction while revolving with it, and provided, respectively, with right and left spiral grooves or screw-threads some of the convolutions of which are concentric and some eccentric to the driving-shaft, in combination with a lever adapted to engage alternately with the said cams and to transmit the motion received therefrom to suitable mechanism by which the plaiting-blade is caused to reciprocate, for the purposes described.

2. In a combined sewing and plaiting machine, a sleeve situated upon and connected with the driving-shaft of the machine by means that will cause it to revolve therewith, and at the same time permit it to move longitudinally in either direction, provided with cams which are formed, respectively, with right and left spiral grooves or screw-threads some of the convolutions of which are concentric and some eccentric to the shaft, in combination with a lever adapted to engage alternately with the said cams and to transmit the motion received therefrom to suitable mechanism by which the plaiting-blade is caused to reciprocate, for the purposes described.

3. In a combined sewing and plaiting machine, a pair of cams secured to a sleeve which revolves with and is free to move longitudinally upon the driving-shaft of the machine by means that will permit of their adjustment thereon with relation to each other, and provided, respectively, with right and left spiral grooves or screw-threads some of the convolutions of which are concentric and some eccentric to the driving-shaft, in combination with a lever adapted to engage alternately with the said cams and to transmit the motion received therefrom to suitable mechanism by which the plaiting-blade is caused to reciprocate, for the purposes set forth.

4. In a combined sewing and plaiting machine, the combination, with a pair of cams secured to the driving-shaft of the machine by means that will permit of their moving longitudinally upon the said shaft in either direction while revolving with it, and provided, respectively, with right and left spiral grooves or screw-threads some of the convolutions of which are concentric and some eccentric to the driving-shaft, of a pair of contact-rollers suitably arranged upon the vibrating lever which imparts the reciprocal motion to the plaiting mechanism, and adapted to engage with the said spiral grooves or screw-threads upon the said cams, substantially in the manner and for the purposes described.

5. In a combined sewing and plaiting machine, the combination, with a pair of cams secured to the driving-shaft of the machine by means that will permit of their moving longitudinally upon the said shaft in either direction while revolving with it, and provided, respectively, with right and left spiral grooves or screw-threads some of the convolutions of which are concentric and some eccentric to the driving-shaft, of a pair of contact-rollers arranged adjustably with relation to each other upon the vibrating lever which imparts the reciprocal motion to the plaiting mechanism, and adapted to engage with the said spiral grooves or screw-threads upon the said cams, substantially in the manner and for the purposes described.

6. In a combined sewing and plating machine, the combination, with a vibrating lever operated by suitable cams upon the driving-shaft of the machine, and which actuates mechanism which thereby imparts a reciprocal movement to the plaiting-blade, of a pair of lateral stops secured to a stationary part of the machine on opposite sides of and in such relation to the said vibrating lever that they limit the extent of its vibration in both direcrections, for the purpose described.

7. In a combined sewing and plaiting machine, the combination, with a vibrating lever operated by suitable cams upon the driving shaft of the machine, and which actuates mechanism which thereby imparts a reciprocal movement to the plaiting-blade, of a pair of lateral stops secured to a stationary part of the machine by means which permit of their adjustment upon opposite sides of and with relation to the said vibrating lever for the purpose of limiting or regulating the extent of its vibration in either direction, for the purposes set forth.

8. In a combined sewing and plaiting machine, the combination, with a vibrating lever actuated by suitable cams upon the driving-shaft of the machine, of an intermediate cam-lever pivoted to a stationary part of the machine, and provided with a double-incline surface which receives the thrust of the said vibrating lever during its oscillation in either direction and transmits the motion thus received to suitable mechanism, which is thereby caused to impart a reciprocal movement to the plaiting-blade, for the purpose described.

9. In a combined sewing and plaiting machine, the intermediate cam or thrust plate adapted to receive the thrust of a vibrating lever actuated by suitable cams upon the driving-shaft of the machine and transmit the motion thus received to suitable mechanism, which is thereby caused to impart a reciprocal movement to the plaiting-blade, the said intermediate cam or thrust plate being secured to the said plaiting mechanism by means that will admit of its adjustment with relation to the position of the fulcrum of the said vibrating lever, for the purposes set forth.

10. In a combined sewing and plaiting machine, the combination, with a vibrating lever actuated by suitable cams upon the driving-shaft of the machine, and with an intermediate cam-surface or thrust-plate which receives the trust of the said vibrating lever during its oscillation in either direction and transmits the motion thus received to suitable mechanism, which is thereby caused to impart a reciprocal movement to the plaiting-blade, of a retractile spring secured at one extremity to a stationary part of the machine, and at the other extremity to the plaiting mechanism at a point which will cause its elasticity to return the parts to their normal positions after the positive thrust of the vibrating lever has ceased, for the purpose described.

11. In a combined sewing and plaiting machine, a vibrating carrier-support hinged to a stationary part of the machine, and having the plaiter-blade carrier pivoted to its upper portion, in combination with a vibrating lever actuated by suitable cams upon the driving-shaft of the machine, and with an intermediate device for receiving the thrust of the said lever and imparting it to the said carrier-support, for the purpose described.

12. In a combined sewing and plaiting machine, a longitudinally-adjustable bearing piece or stop upon the vibrating plaiter-carrier support for receiving the thrust of an intermediate cam-lever pivoted to a stationary part of the machine, and provided with a double-incline surface, which receives the thrust of a vibrating lever actuated by suitable cams upon the driving-shaft of the machine, the said bearing piece or stop being adapted to be varied in position with relation to the fulcrum of the intermediate lever for the purpose of regulating the extent of motion of the plaiter-carrier support, for the purpose described.

13. In a combined sewing and plaiting machine, in combination with a vibrating plaiter-carrier support hinged to a stationary part of the machine and reciprocated through the medium of an intermediate cam or thrust plate and a retractile spring by a vibrating lever which is actuated by suitable cams upon the driving-shaft of the machine, an adjustable stop mounted upon a stationary part of the machine in such relation to the said vibrating plaiter-carrier support that it may be adjusted to limit the inward or retractile movement of the latter, for the purpose set forth.

14. In a combined sewing and plaiting machine, a vibrating plaiter-carrier support actuated through the medium of a double-incline cam or thrust plate by a vibrating lever which receives its motion from suitable cams upon the driving-shaft of the machine, the said plaiter-carrier being hinged to a stationary part of the machine in such manner that when the parts are in their normal positions it will occupy a vertical or nearly vertical position, for the purpose set forth.

15. In a combined plaiting and sewing machine, the combination, with a plaiting-blade attached to a reciprocating carrier, of a projecting arm or lateral extension of the presser-bar by which the lower edge of the said plaiting-blade is elevated whenever the presser-bar is raised, but which allows the said blade to perform its work when the presser-bar is lowered, for the purpose set forth.

16. In a combined sewing and plaiting machine, an independent device for smoothing and retaining the material to be operated upon secured to a stationary part of the machine and formed of an elastic plate the lower edge of which coincides with or approximates the position of the needle in a line substantially at right angles to the direction in which the said material is fed to the needle, for the purposes set forth.

17. In a combined sewing and plaiting machine, a device for smoothing and retaining the material to be operated upon, consisting of a suitable elastic plate secured to a fulcrum mounted upon a stationary part of the machine, which fulcrum is formed with a lateral projection or arm provided with a set-screw or similar adjustable device, which bears against a stationary part of the machine, for the purpose described.

18. In a combined sewing and plaiting machine, the combination, with an independent device for smoothing and retaining the material to be operated upon, of a projecting arm or lateral extension of the presser-bar, which projects under the said smoothing and retaining device in such manner that when the presser-bar is raised the said smoothing and retaining device will also be elevated away from the parts underneath it, for the purpose described.

WILLIAM F. BEARDSLEE.

Witnesses:
   STEUBEN T. BACON,
   JOHN HOCH.